March 26, 1963  F. F. OFFNER  3,082,954
ELECTRICAL TEMPERATURE CONTROL SYSTEM WITH FEEDBACK
Original Filed March 31, 1949
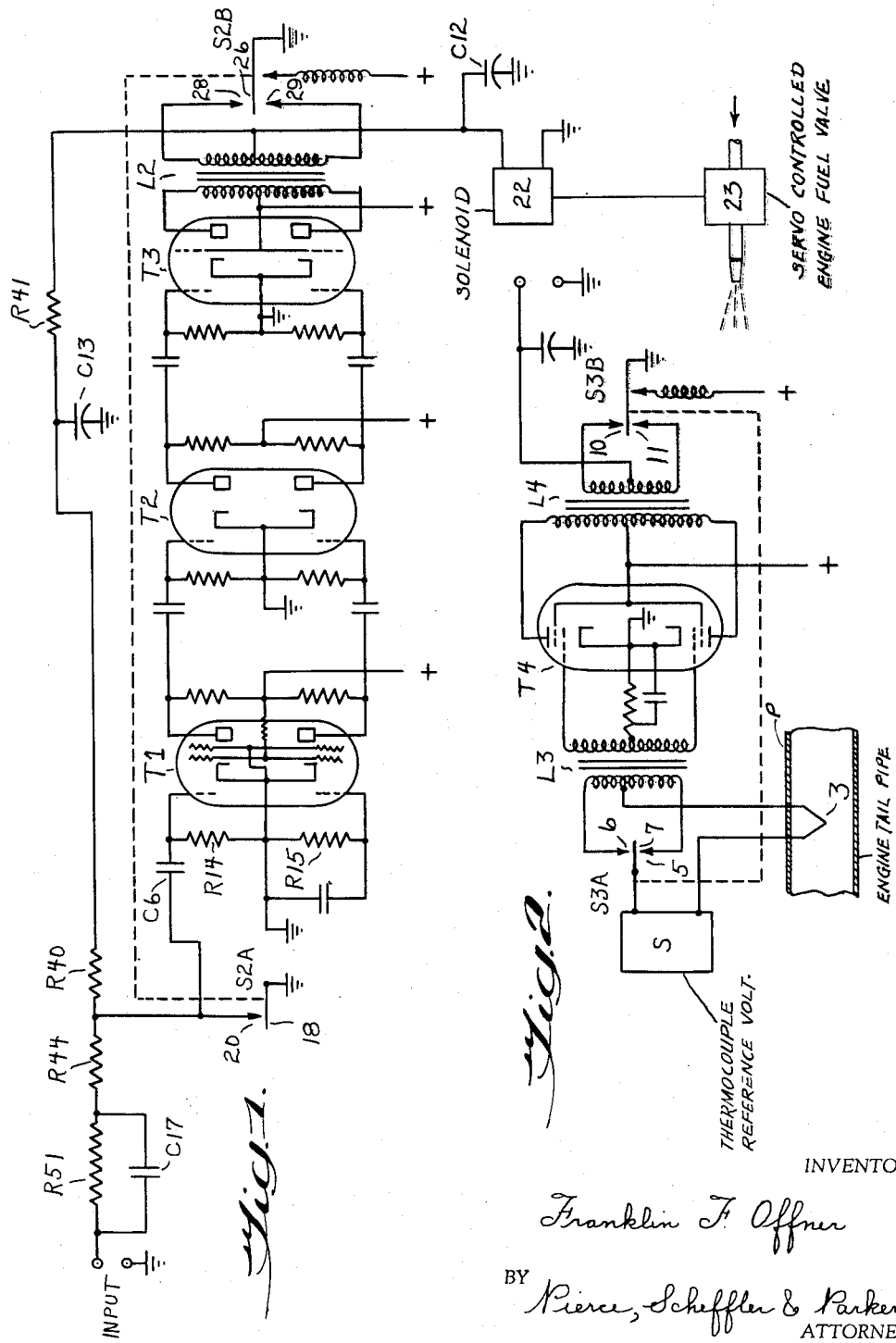
INVENTOR
Franklin F. Offner
BY Pierce, Scheffler & Parker
ATTORNEYS ial Temperature Control System
with Feedback Franklin F. Offner, 4300 Marine Drive, Chicago, Ill.
Original application Mar. 31, 1949, Ser. No. 84,696, now
Patent No. 2,697,908, dated Dec. 28, 1954. Divided
and this application Oct. 25, 1954, Ser. No. 464,435
2 Claims. (Cl. 236—78)

This invention relates to control systems of the electronic type for regulating purposes and is a division of my co-pending application Serial No. 84,696, filed March 31, 1949, now U.S. Patent No. 2,697,908, granted December 28, 1954. The latter discloses a control system of the null-seeking type for accelerating jet engines of the gas turbine type from an idling to a selected running speed in a manner consistent with safe limits of certain engine parameters such as engine temperature, and thereafter maintaining the engine at the selected running speed. By null-seeking type is meant a system wherein a signal variable with the magnitude of the parameter is compared with a value representative of the maximum of that parameter that can be tolerated and the difference between the two is utilized to control fuel flow to the engine in such manner as will reduce that difference to zero thereby establishing the engine parameter at its maximum allowable value. In the co-pending application, initial acceleration of the engine is controlled as a function of engine temperature and final acceleration up to the selected running speed is controlled as a function of the relation between the instant engine speed and the selected running speed. After the selected running speed is attained, means are also provided to reduce fuel flow in the event that the engine temperature rises to a dangerously high value.

The present invention relates to the temperature control circuit per se which is more broadly applicable to other control systems and is directed to a novel arrangement for stabilizing the temperature in such manner as will prevent the system from overshooting, i.e. from over-correcting a condition thereby preventing the control system from "hunting" or oscillating about an amplitude of the parameter desired to be maintained. A more specific object is to provide a self-correcting electronic control system of the null-seeking type which provides the full value of the corrective signal at the outset of the correcting period and thereafter tapers off that signal in advance of the actual decrease in the signal in order to prevent the system from over-correcting itself. Still another object is to provide a self-correcting electronic control system of the null-seeking type including a negative feed-back circuit in the signal amplifier wherein application of the feed-back signal is delayed. The advantage of this is that at the beginning of a correcting phase, the full gain of the amplifier is effective for amplifying the correcting signal. Thereafter the effect of the negative feedback is such as to partially cancel the applied correcting signal by reducing the amplifier gain, the overall result being that any inherent delays in the system, particularly in building the applied signal are anticipated and compensated for thus making the system more sharply responsive.

One embodiment of the invention as applied to temperature control in a combustion gas turbine engine for jet propulsion is illustrated in FIGURE 1 of the accompanying drawings which is the same as FIGURE 2 of my parent application Serial No. 84,696 except that parts of the circuit not essential to an understanding of this invention have been omitted in the interest of simplifying the disclosure.

FIGURE 2 illustrates a modification of the present invention and also consists of a portion of FIGURE 2 of my aforesaid application Serial No. 84,696.

With reference now to FIGURE 1, an electrical signal voltage is derived proportional to the difference between the actual temperature being controlled such as, for example, the tail-pipe temperature of a jet engine and a temperature desired to be maintained at such tail-pipe. This signal is applied to the terminals legended "Input." The signal is first passed through a combination of resistor R51 and condenser C17 in parallel, thence through resistor R44 to a stationary contact 20 on vibratory switch S2A. This contact is periodically grounded by vibration of contact 18 thus chopping the input signal. The chopped signal is led through condenser C6 to one input grid of an amplifier consisting of three dual tube stages T1, T2, and T3 of push-pull amplification. The output of this amplifier is taken through transformer L2 to vibratory switch S2B which is mechanically coupled to switch S2A as indicated by the dashed lines so that the two switches operate in synchronism. Vibratory contact 26 of switch S2B periodically grounds the two ends of the secondary of transformer L2 through stationary contacts 28, 29. As a result, a rectified signal appears at the center tap of the secondary of transformer L2, this rectified signal being substantially proportional to the signal applied to terminal 20 of the input vibratory switch S2A. The rectified signal after being filtered by condenser C12 is applied to a polarized solenoid 22 which operates the temperature controlling mechanism. A portion of the rectified output signal is led through resistor R41 to resistor R40, which is fed back to the input of the amplifier. The junction point of resistors D40 and R41 is connected to one side of condenser C13, and the other side of this condenser is grounded.

The amplifier is so connected that application of a positive signal to terminal 20 produces a negative signal at the center tap of the secondary of transformer L2. Therefore the signal fed back in the manner described above will be in negative relationship.

Operation of the circuit of FIG. 1 as applied to control of temperature of a jet turbine engine would be as follows: An electrical signal derived from the gases flowing through the tail pipe of the engine, the signal representing the departure of the temperature of these gases from the desired operating temperature is applied to the input terminals. The signal may be derived from a thermocouple, resistance thermometer, or other means made responsive to temperature of the tail-pipe gases. It will be assumed that a rise in temperature above the value desired to be maintained produces a positive voltage at the upper input terminal of the FIG. 1 circuit. This signal led to contact 20, is converted into a pulsating direct current by operation of the vibrating switch S2A. The pulsating component of this current is passed through condenser C6, and amplified. As described above, switch S2B operating synchronously with switch S2A rectifies the amplified pulsating signal. Also as described, the positive signal applied to contact 20 will produce a negative signal at the center tap on the secondary of transformer L2. This negative signal applied to solenoid 22 is arranged to operate a servo mechanism, shown as a servo controlled fuel valve 23, controlling the flow of fuel into the engine. This effects a decrease in fuel flow to the engine so long as the positive signal exists at the input terminals. When the tail-pipe temperature falls to the desired value, the signal falls to zero and the fuel flow remains at that value until it is further changed by subsequent deviations in temperature from normal. A decrease in temperature of the tail-pipe gases will produce a negative voltage at the upper input terminal which in turn will produce a positive signal at the output of transformer L2 which when applied to control solenoid 22 will effect an increase in fuel flow until the desired temperature is reached.

The above description does not take into account the action of condensers C17 and C13. The purpose of these condensers is to stabilize the system in accordance with the present invention. Due to delays in operation of the temperature indicating means, as well as in other operating components such as the servo mechanism, operation of the system would be unstable without these condensers and the temperature would tend to overshoot, and in most cases oscillate i.e. "hunt" continually about the temperature desired to be maintained.

Condenser C13 operates in the following manner to reduce the possibility of oscillation in the system. When the above assumed positive signal is applied to the input terminals, the negative signal is produced at the center tap on the secondary of transformer L2. This negative signal is fed back through R41. However, at the start very little voltage is developed across condenser C13 since this condenser only starts charging when the voltage is applied through resistor R41. Not until the signal voltage has been applied to condenser C13 for some time does the full feedback voltage develop across this condenser. This time depends upon the time constant of the circuit established by resistors R40, R41 and condenser C13. As a result, at the start, the full gain of the amplifier is effective, and a large signal is applied to solenoid 22. However, after this initial delay, and as the voltage starts to build up across condenser C13, a negative feedback voltage is applied to the input of the amplifier through resistor R40, partially cancelling the applied input signal. Even after the input signal may fall to zero, some negative voltage will for a time be delivered to the amplifier input from condenser C13, since this condenser will also take some time to discharge. As a result, the amplifier will act as if the temperature had dropped to its desired value at a time before the temperature had in fact so dropped. The action of condenser C13 is therefore to anticipate temperature changes and in this manner such condenser helps to counteract the effect of delays in the temperature control system, thus making the system more rapidly responsive and less likely to overshoot or oscillate.

Condenser C17 at the signal input circuit is also effective in stabilizing the system. First, assuming this condenser to be omitted from the circuit, a suddenly applied input voltage would be decreased in amplitude before being applied to switch contact 20, by being dropped through resistor R51. In a typical circuit, the voltage developed at switch contact 20 might be one-fifth the value it would have were resistor R51 to be omitted from the circuit. Now consider the same input circuit with condenser C17 connected in parallel with resistor R51. At the beginning of a signal, condenser C17 is not charged. A suddenly applied signal voltage at the input will cause current to flow through condenser C17 in such a way that at the start the voltage developed at switch contact 20 would be the same as if resistor R51 were not in the circuit. However, as the voltage is maintained on the input, condenser C17 becomes fully charged, so that resistor R51 becomes effective, the input voltage being decreased at contact 20. The result is therefore that a suddenly applied input signal gives first a large input to the amplifier, which signal falls off as the signal is maintained. This effect is desirable in that it rapidly applies a corrective signal to the system, but as the signal becomes effective at the fuel control solenoid 22, the signal decreases in amplitude, so that a large signal is not maintained as the system approaches its desired operating temperature point.

If thermocouples are used to sense the temperature to be controlled, it may be desirable in some cases, due to the small voltage output characteristic of a thermocouple, to amplify the thermocouple voltage before applying the same to the input of the amplifier of the FIG. 1 circuit. In such cases, the pre-amplifier circuit shown in FIG. 2 may be utilized. With reference now to FIG. 2, the source of comparison voltage which is represented schematically by the block S, is connected in series with the thermocouple 3 which is placed in thermal contact with the gas whose temperature is to be regulated, e.g. in the tail-pipe P of the engine, so that the voltage applied between the center tap on the primary of transformer L3 and the vibrating contact 5 of vibrating switch S3A represents the deviation in the gas temperature from the temperature desired to be maintained. The operation of switch S3A is similar to that of S2A above described, converting the output of the thermocouple 3 into a rectangularly shaped alternating current wave. This wave is applied through transformer L3 to the input of the pre-amplifier which is shown as a single stage push-pull amplifier with dual tube T4. The output of this amplifier is passed through transformer L4, and converted to a direct current as also above described, through the action of vibrating switch S3B which operates synchronously with switch S3A as indicated by the dashed line connecting the movable contact elements of these two switches. The output of the amplifier is then applied to the input of the amplifier of FIG. 1.

Certain advantages of the amplifier shown in FIGS. 1 and 2 should be noted. These amplifiers amplify only on alternating current, and only that component of the alternating current signal which is the same frequency, and in phase with, the vibrating switch at the input is effective in producing a direct current output. Therefore, the amplifiers are quite unaffected by noise pick-up or noise generated therein, and they produce no spurious output due to any shift in the operating point of the vacuum tubes, as would occur with the conventional direct current type of amplifier. The output is very closely a replica of the difference between the thermocouple voltage and the reference or comparison voltage S in the circuit of FIG. 2; or the input voltage in FIG. 1, which is modified only by the action of stabilizing the circuits contained within the amplifier in accordance with the present invention.

A further important advantage should be noted, particularly, in the circuit of FIG. 2. This is the use of push-pull in the amplifier, together with the vibrating switches. The result of the push-pull operation is that the amplifier will continue to operate even though either the upper or lower tube in the circuit fails to function. It then operates as a "single-ended" amplifier, still producing a usable output representative of the input voltage, although a lower amplification may result.

The same safety factor occurs also in the circuit of FIG. 1, except in the first amplifier tube T1, where the signal is applied only to one of the input tubes. Assuming that this tube functions properly, a push-pull signal is produced at the output, and any one of the following tubes may fail to function, and yet the amplifier will still give a usable output, resulting in control of the controlled element, although possibly with less amplification.

While the vacuum tubes are shown as dual tubes, two separate tubes may, of course, be employed, if it is desired to further protect against a possible breakage of the tubes.

From the above description, it will be apparent that a highly sensitive control system has been described, providing very great accuracy with a high degree of reliability. Furthermore, stabilizing means has been described which will make possible a stable steady state control of temperature, as well as providing stability in the case of a change in the desired temperature.

I claim:

1. In a system of temperature control, means for producing an electrical signal representative of the deviation in temperature to be controlled from the temperature desired to be maintained; amplifier means for amplifying said signal, control means for a parameter which will vary the temperature to be controlled, said control means being controlled by the output of said amplifier means, and integral negative feedback means to reduce the gain of said amplifier means, said feedback means including resistive means transmitting a D.C. signal from the output to the input of said amplifier means and capacitive means by-passing alternating current components of the feedback signal for effecting a time delay in the application of the signal fed back through said feedback means.

2. In a system of temperature control, means for producing an electrical signal representative of the deviation in temperature to be controlled from the temperature desired to be maintained, first periodically operated switching means for commutating said signal, amplifier means for amplifying said commutated signal, second periodically operated switching means at the output of said amplifier means actuated in synchronism with said first switching means for converting said signal back to its original form, control means for a parameter which will vary the temperature to be controlled, said control means being controlled by said converted signal, and integral negative feedback means for conducting a portion of said converted signal in reverse polarity to the input of said amplifier means to reduce the gain thereof, said feedback means including resistive means transmitting a D.C. signal to the input of said amplifier means and capacitive means by-passing alternating current components of the feedback signal for effecting a time delay in the application of the signal fed back through said feedback means.

References Cited in the file of this patent

UNITED STATES PATENTS

| | | |
|---|---|---|
| 2,117,800 | Harrison et al. | May 17, 1938 |
| 2,118,248 | Keinath | May 24, 1938 |
| 2,154,375 | Chambers | Apr. 11, 1939 |
| 2,282,726 | Jones | May 12, 1942 |
| 2,297,543 | Eberhardt | Sept. 29, 1942 |
| 2,399,675 | Hays | May 7, 1946 |
| 2,456,420 | Jackson | Dec. 14, 1948 |
| 2,690,647 | Woodward | Oct. 5, 1954 |

OTHER REFERENCES

Article in Chemical and Metallurgical Engineering, May 1943, pages 108–124 (only pages 122–124 relied upon).

Whiteley: "Theory of Servo Systems," Journal of the Institution of Electrical Engineers, volume 93, part II, 1946, pages 353–367 (only pages 359–364 relied upon).